United States Patent [19]

Epperly et al.

[11] Patent Number: 4,863,705
[45] Date of Patent: Sep. 5, 1989

[54] PROCESS FOR THE REDUCTION OF NITROGEN OXIDES IN AN EFFLUENT

[75] Inventors: William R. Epperly, New Canaan; James C. Sullivan, Southport; Barry N. Sprague, West Haven, all of Conn.

[73] Assignee: Fuel Tech, Inc., Stamford, Conn.

[21] Appl. No.: 100,128

[22] Filed: Sep. 23, 1987

[51] Int. Cl.$^4$ .............................................. C01B 21/00
[52] U.S. Cl. .................................................. 423/235
[58] Field of Search ..................... 423/235, 239, 239 A

[56] References Cited

U.S. PATENT DOCUMENTS

| | | | |
|---|---|---|---|
| 3,801,696 | 4/1974 | Mark | 423/212 |
| 3,846,981 | 11/1974 | Paczkowski | 60/286 |
| 3,900,554 | 8/1975 | Lyon | 423/235 |
| 4,080,423 | 3/1978 | Smith et al. | 423/235 |
| 4,081,509 | 3/1978 | Hishinuma et al. | 423/235 |
| 4,208,386 | 6/1980 | Arand et al. | 423/235 |
| 4,325,924 | 4/1982 | Arand et al. | 423/235 |
| 4,388,281 | 6/1983 | Holter et al. | 423/239 |
| 4,507,269 | 3/1985 | Dean et al. | 423/235 |
| 4,624,840 | 11/1988 | Dean et al. | 423/235 |

FOREIGN PATENT DOCUMENTS

| | | | |
|---|---|---|---|
| 2630202 | 2/1977 | Fed. Rep. of Germany . | |
| 50-67669 | 12/1976 | Japan . | |
| 53-128023 | 4/1977 | Japan . | |
| 51-1138 | 7/1977 | Japan . | |
| 51-4588 | 7/1977 | Japan . | |
| 51-12330 | 8/1977 | Japan . | |
| 5189176 | 2/1978 | Japan . | |
| 54-51986 | 4/1979 | Japan | 423/239 |
| 57-190638 | 11/1982 | Japan | 423/235 |

*Primary Examiner*—John Doll
*Assistant Examiner*—Lori S. Freeman
*Attorney, Agent, or Firm*—St. Onge Steward, Johnston & Reens

[57] ABSTRACT

A process is presented for the reduction of nitrogen oxides in the effluent from the combustion of a carbonaceous fuel. The process comprises introducing a treatment agent comprising a compound selected from the group consisting of five or six-membered heterocyclic hydrocarbons having at least on cyclic nitrogen into an effluent under conditions effective to reduce the concentration of nitrogen oxides in the effluent.

42 Claims, No Drawings

PROCESS FOR THE REDUCTION OF NITROGEN OXIDES IN AN EFFLUENT

DESCRIPTION

1. Technical Field

The present invention relates to a process for the reduction of nitrogen oxides ($NO_x$) in the effluent, especially the oxygen-rich effluent, from the combustion of a carbonaceous fuel by introduction of a treatment agent comprising a compound selected from the group consisting of five or six-membered heterocyclic hydrocarbons having at least one cyclic nitrogen into the effluent.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F., and typically about 2200° F. to about 3000° F., are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F.

Nitrogen oxides, especially $NO_2$, are troublesome pollutants which are found in the combustion effluent streams of boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides comprise a major portion of acid rain.

Unfortunately, the temperatures within a utility or circulating fluidized bed boiler render most common methods of reducing $NO_x$ concentrations, such as effluent scrubbing or catalyst grids, either uneconomical, infeasible, or both.

2. Background Art

Various methods and compositions for reducing the $NO_x$ concentration in the effluent from the combustion of a carbonaceous fuel have been proposed. For instance, Arand et al, in U.S. Pat. No. 4,208,386, disclose a method for reducing $NO_x$ in combustion effluents by injecting urea, either as a solid powder or in solution, at effluent temperatures in excess of 1300° F. The preferred urea solutions are those having at least 10 weight percent urea. For operation at temperatures below 1600° F., the use of reducing materials such as paraffinic, olefinic, aromatic and oxygenated hydrocarbons, as well as hydrogen, are required.

Bowers, in copending and commonly assigned U.S. patent application Ser. No. 906,671, filed Sept. 10, 1986, now U.S. Pat. No. 4,751,065, discloses the use of a solution which comprises urea and hexamethylenetetramine (HMTA) to reduce the $NO_x$ concentration in oxygen-rich effluents having temperatures above 1300° F. Similarly, Bowers, in copending and commonly assigned U.S patent application Ser. No. 784,828, filed Oct. 4, 1985, now U.S. Pat. No. 4,719,092, discloses a solution comprising urea and an oxygenated hydrocarbon solvent which is disclosed as being effective at reducing $NO_x$ concentrations with reduced ammonia slippage in effluents at temperatures above 1600° F.

In copending and commonly assigned U.S. patent application Ser. No. 022,799, filed Mar. 6, 1987, Sullivan discloses the use of hydrocarbons to reduce $NO_x$ levels in effluents at low temperatures (i.e., below 1450° F., especially below 1300° F. ). Although the prior art processes for reducing nitrogen oxides concentrations are generally effective, there exists a present need for a process which elicits still further $NO_x$ reductions in an economical and convenient manner.

DISCLOSURE OF INVENTION

The present invention relates to a process for reducing nitrogen oxides in the effluent from the combustion of a carbonaceous fuel. More particularly, the present invention relates to a process which comprises injecting into the effluent from the combustion of a carbonaceous fuel a treatment agent comprising a five or six-membered heterocyclic hydrocarbons having at least one cyclic nitrogen, particularly piperazine, piperidine, pyridine, oxazolidone, pyrazole, imidazole, pyrazine, pyrrole and pyrrolidine under conditions effective to reduce the nitrogen oxides concentration in the effluent.

BEST MODE FOR CARRYING OUT THE INVENTION

For the purposes of this description, all temperatures herein are measured using an unshielded K-type thermocouple. Unless otherwise indicated, all parts and percentages are based on the weight of the composition at the particular point of reference.

The term "five or six-membered heterocyclic hydrocarbon having at least one cyclic nitrogen" as used herein refers to a cyclic five or six member hydrocarbon in which one or more of the atoms in the ring is nitrogen. The cyclic compounds can be either saturated or unsaturated. Preferably, compounds of this class useful in the present invention are selected from the group consisting of piperazine, piperidine, pyridine, oxazolidone, pyrazole, imidazole, pyrazine, pyrrole and pyrrolidine, as well as organic and inorganic acid salts thereof.

The term "piperazine" as used in this description refers to a compound having the general formula:

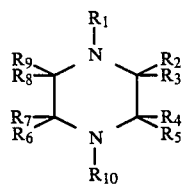

wherein $R_1$–$R_{10}$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "R" groups can be linked, directly or indirectly, to form another ring. The term "piperidine" as used in this description refers to a compound having the general formula:

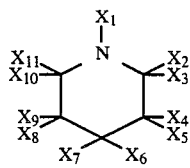

wherein $X_1$–$X_{11}$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "X" groups can be linked, directly or indirectly, to form another ring.

The term "pyridine" as used in this description refers to a compound having the general formula:

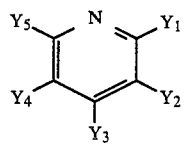

wherein $Y_1$–$Y_5$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Preferred pyridines contemplated as useful in this invention include 4-methyl pyridine and 3-amino pyridine. Additionally, any two adjacent "Y" groups can be linked, directly or indirectly, to form another ring.

The term "oxazolidone" as used in this description refers to a compound, such as 2-oxazolidone, having the formula:

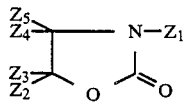

wherein $Z_1$–$Z_5$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "Z" groups can be linked, directly or indirectly, to form another ring.

The term "pyrazole" as used in this description refers to a compound having the general formula:

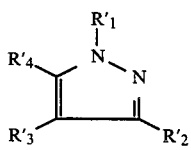

wherein $R'_1$–$R'_4$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "R'" groups can be linked, directly or indirectly, to form another ring.

The term "imidazole" as used in this description refers to a compound having the general formula:

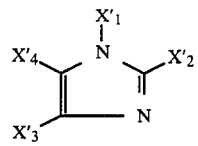

wherein $X'_1$–$X'_4$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "X'" groups can be linked, directly or indirectly, to form another ring.

The term "pyrazine" as used in this description refers to a compound having the general formula:

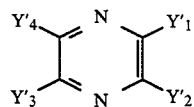

wherein $Y'_1$–$Y'_4$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "Y'" groups can be linked, directly or indirectly, to form another ring.

The term "pyrrole" as used in this description refers to a compound having the general formula:

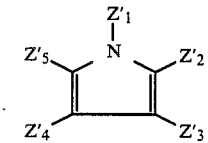

wherein $Z'_1$–$Z'_5$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "Z'" groups can be linked, directly or indirectly, to form another ring.

The term "pyrrolidine" as used in this description refers to a compound having the general formula:

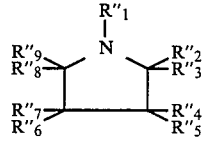

wherein $R''_1$–$R''_9$ are, independently, any of hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent "R''" groups can be linked, directly or indirectly, to form another ring.

Preferred substituents for each of the "R", "X", "Y", "Z", "R'", "X'", "Y'", "Z'" and "R''" groups of the compounds described above include hydrogen, straight and branched-chain, substituted and unsubstituted aliphatic groups, oxygenated hydrocarbon groups, hydroxyl groups and amino groups. Moreover, it is understood that the above-defined terms include polymerization and condensation products thereof.

As used herein, the term "alkyl" refers to a straight or branched chain hydrocarbon containing no unsaturation, e.g., methyl, ethyl, isopropyl, 2-butyl, neopentyl, n-hexyl, etc.; the term "alkoxy" refers to a univalent radical composed of an alkyl group linked through an oxygen atom having its free valence bond therefrom, e.g., methoxy (—O—CH$_3$), ethoxy (—O—CH$_2$—CH$_3$), etc.; the term "acyl" refers to a carboxyl group in which the hydroxyl group has been replaced with another radical, such as alkyl, aryl, etc., e.g., acetyl

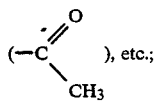

the term "carbocyclic" refers to an organic radical whose 'skeleton' is in the form of a closed ring of carbon atoms; the term "aryl" refers to an aromatic hydrocarbon group, e.g., phenyl, benzyl, naphthyl, etc.; the term "carboxyl" refers to a univalent radical composed of a carbonyl group and a hydroxyl group linked through a carbon atom having its free valence bond therefrom, e.g.,

the term "carbonyl" refers to a bivalent radical having the formula:

the term "hydroxyl" refers to the univalent group —OH which is characteristic of alcohols; the term "hydroxyalkyl" refers to an alkyl group having at least one hydrogen substituted with an hydroxyl group; the term "alkoxyalkyl" refers to an alkyl group having at least one hydrogen substituted with an alkoxy group; the term "thiohydroxyalkyl" refers to a hydroxyalkyl group wherein the oxygen of the hydroxyl group is replaced with sulfur; and the term "alkenyl" refers to an unsaturated radical of lower branched or unbranched alkyl groups it is derived from, having at least on double bond therein.

The treatment agent of this invention advantageously further comprises urea or ammonia. The terms "urea" and "ammonia" as used in this description includes the compounds themselves, as well as compounds equivalent in effect. Thus, unless otherwise specified, reference in this disclosure to urea or ammonia should not be taken as limiting to urea or ammonia themselves, but should extend to urea or ammonia and all of their equivalents. It is pointed out that the term equivalent is not limited to exact equivalents, and various equivalents will be optimally operable at some conditions which are different than those for other equivalents. Moreover, some equivalents may be more effective than others. The term "ammonia" is specifically intended for the purposes of this disclosure to include ammonia precursors, that is, compounds which produce ammonia upon vaporization, such as ammonium salts of organic acids like ammonium formate, ammonium oxalate, ammonium carbonate and ammonium bioxalate.

Advantageously, the treatment agent of this invention is introduced into the effluent in solution or as a dispersion or mixture in a suitable solvent. Water is a preferred solvent due to the economy of aqueous solutions, dispersions and mixtures and the fact that they can be employed with suitable effectiveness in most situations. For ease of description, the term "mixture" will be used to denote mixtures, dispersions and solutions. The effective mixture comprising the treatment agent of this invention will range from saturated to dilute. While water is an effective solvent for most applications, it will be recognized that there may be instances where other solvents may be advantageously used, either alone or in combination with water, as would be known to the skilled artisan.

The level of five or six-membered heterocyclic hydrocarbon having at least one cyclic nitrogen present in the mixture is preferably in the range of about 0.5% to about 25% by weight, most preferably about 5% to about 15% by weight. Where urea or ammonia is employed in the treatment agent, it should preferably be present in the mixture in the range of about 2% to about 60%, most preferably about 5% to about 30% by weight. The weight ratio of five or six-membered heterocyclic hydrocarbon having at least one cyclic nitrogen to urea or ammonia, when urea or ammonia is used in the treatment agent mixture, should advantageously be about 1:10 to about 4:1, more preferably about 1:5 to about 3:1. The most preferred weight ratio in the mixture is about 1:4 to about 2.5:1.

The temperature of the effluent at the point of introduction will have an influence on the concentration of the mixture. At temperatures of about 1300° F. to about 170° F., the mixture will tend to operate effectively at high concentration, e.g., about 10% to about 65% by weight treatment agent. On the other hand, at temperatures in excess of about 1700° F., the mixture will tend more towards dilute. At these higher temperatures, water (or the solvent in case of non-aqueous solutions) may comprise greater than 80%, 85% or even 90% by weight of the mixture.

The treatment agent of this invention is preferably introduced into the effluent in an amount effective to elicit a reduction in the nitrogen oxides concentration in the effluent. Advantageously, the treatment agent of this invention is introduced into the effluent in an amount sufficient to provide a molar ratio of the nitrogen contained in the treatment agent to the baseline nitrogen oxides level of about 1:5 to about 10:1. More preferably, the treatment agent is introduced into the effluent to provide a molar ratio of treatment agent nitrogen to baseline nitrogen oxides level of about 1:3 to about 5:1, most preferably about 1:2 to about 3:1.

The treatment agent, whether in a mixture or introduced in pure form, is advantageously introduced into the effluent gas stream at a point where the effluent is at a temperature above about 1200° F. Preferably, the treatment agent of this invention is introduced at a point where the effluent temperature is above about 1300° F., more preferably above about 1400° F. and most preferably above about 1450° F. Large industrial and circulating fluidized bed boilers of the types employed for utility power plants and other large facilities will typically have access only at limited points In the most typical situations, the boiler interior in the area above the flame operates at temperatures which at full load approach 1900° F., even 2000° F. and sometimes higher still. After subsequent heat exchange, the temperature will be lower, usually in the range between about 1300° F. and about 1900° F. At these temperatures, the treatment agent of this invention can be effectively introduced to accomplish substantial reduction of nitrogen oxides in the effluent.

The treatment agent utilized according to this invention is preferably introduced by injecting it at a number of spaced positions from nozzles or other apparatus which are effective to uniformly distribute the treatment agent through the combustion effluent.

The effluent into which the treatment agent of this invention is introduced is preferably oxygen-rich, meaning that there is an excess of oxygen in the effluent. Advantageously, the excess of oxygen is greater than about 1% by volume. More preferably, the excess of oxygen is in the range of about 1% to about 12% or greater by volume, most preferably about 1% to about 6% by volume.

It will be understood that the $NO_x$ reducing treatment agents of this invention are useful not only where substantial nitrogen oxides reductions are accomplished by directly applying the disclosed method as the principal $NO_x$ reducing method, but can also be employed as a discrete step in combination with other chemical, catalytic or other procedures for reducing nitrogen oxides concentrations as well as other pollutants such as sulfur dioxide ($SO_2$), while preferably controlling levels of residual pollutants such as ammonia and/or carbon monoxide. Such a suitable "multi-step" process is disclosed in copending and commonly assigned U.S. Patent Application entitled "Multi-Stage Process for Reducing the Concentration of Pollutants in an Effluent" filed in the names of Epperly, Peter-Hoblyn, Shulof and Sullivan Mar. 6, 1987 and assigned Ser. No. 022,716, now U.S. Pat. No. 4,777,024, the disclosure of which is incorporated herein by reference.

A further advantageous aspect of the practice of this invention is in the reduced production of other pollutants, such as ammonia and carbon monoxide, during the nitrogen oxides reduction process. The presence of ammonia in the effluent should be avoided because, among other reasons, it can react with $SO_3$ to form ammonium bisulfate which can foul heat exchange surfaces in a boiler Moreover, ammonia has detrimental effects on ambient air quality, as has carbon monoxide Such lower levels of the production of other pollutants such as ammonia and carbon monoxide can most effectively be achieved by introducing the treatment agents of this invention on the right side of their nitrogen oxides reduction versus effluent temperature curve, especially on the right side of the curve plateau. This process is fully explained and taught in copending and commonly assigned U.S. patent application Ser. No. 050,198, entitled "Process for Nitrogen Oxides Reduction and Minimization of the Production of Other Pollutants", filed May 14, 1987 in the names of Epperly, O'Leary and Sullivan, now U.S. Pat. No. 4,780,289, the disclosure of which is incorporated herein by reference.

The following examples further illustrate and explain the invention by detailing the operation of a treatment agent comprising a five or six-membered heterocyclic hydrocarbon having at least one cyclic nitrogen in the reduction of nitrogen oxides emissions.

EXAMPLE I

The burner used is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are introduced is measured at the point of injection utilizing a K-type thermocouple. Atomizing injectors described in copending and commonly assigned U.S. Patent Application entitled "Process and Apparatus for Reducing the Concentration of Pollutants in an Effluent" having Serial Number 009,696, filed in the name of Burton on Feb. 2, 1987, the disclosure of which is incorporated herein by reference, are positioned through ports in the effluent flue conduit in order to introduce and distribute the treatment agents into the effluent stream. The agents are introduced into the effluent at a rate of 30 ml/hr. The burner fuel is a Number 2 fuel oil, and the burner is fired at a rate of 7.2 lbs/hr to 9.6 lbs/hr. to achieve the desired temperature.

A baseline nitrogen oxides concentration reading is taken prior to beginning each run to calculate the introduction ratio of treatment agent to baseline nitrogen oxides, and a final nitrogen oxides reading is taken during and downstream from introduction of the treatment agents to calculate the reduction in the nitrogen oxides concentration in the effluent elicited by each of the treatment agents introduced. Additionally, ammonia and carbon monoxide readings are taken during and downstream from introduction of the treatment agents to measure the production of other pollutants.

The percent excess oxygen for each treatment agent introduction, the baseline $NO_x$, final $NO_x$, % reduction of $NO_x$, ammonia level and carbon monoxide level for each run is set out in Table 1.

The following runs are made:

(1) the treatment agent introduced is an aqueous solution which comprises 10% by weight of 4-methyl pyridine and 0.1% by weight of a commercially available surfactant and the introduction temperature is 1340° F. (run 1a), 1450° F. (run 1b), and 1525° F. (run 1c).

(2) the treatment agent introduced is an aqueous solution which comprises 10% by weight of 3-aminopyridine and 0.1% of a commercially available surfactant and the introduction temperature is 1515° F.;

(3) the treatment agent introduced is an aqueous solution which comprises 10% by weight of pyrrolidine and 0.1% of a commercially available surfactant and the introduction temperature is 1520° F.;

(4) the treatment agent introduced is an aqueous solution which comprises 10% by weight of 2-oxazolidone and 0.1% by weight of a commercially available surfactant and the introduction temperature is 1240° F. (run 4a) and 1525° F. (run 4b);

(5) the treatment agent introduced is an aqueous solution which comprises 10% by weight of pyrazole and 0.1% by weight of a commercially available surfactant and the introduction temperature is 1245° F. (run 5a) and 1530° F. (run 5b);

(6) the treatment agent introduced is an aqueous solution which comprises 10% by weight of imidazole and 0.1% by weight of a commercially available surfactant and the introduction temperature is 1250° F. (run 6a) and 1535° F. (run 6b);

(7) the treatment agent introduced is an aqueous solution which comprises 10% by weight of pyrazine and 0.1% by weight of a commercially available surfactant and the introduction temperature is 1250° F. (run 7a) and 1535° F. (run 7b);

(8) the treatment agent introduced is an aqueous solution which comprises 10% by weight of pyrrole and 0.1% by weight of a commercially available surfactant and the introduction temperature is 1250° F. (run 8a) and 1540° F. (run 8b);

(9) the treatment agent introduced is an aqueous solution which comprises 10% by weight of piperdine and 0.1% by weight of a commercially available surfactant and the introduction temperature is 1250° F. (run 9a) and 1525° F. (run 9b); and

(10) the treatment agent introduced is an aqueous solution which comprises 10% by weight of piperazine and 0.1% by weight of a commercially availably surfactant and the introduction temperature is 1230° F. (run 10a) and 1525° F. (run 10b ).

TABLE 1

| Run | $O_2$ (%) | $NO_x$ (ppm) Baseline | Final | $NO_x$ red. (%) | $NH_3$ (ppm) | CO (ppm) |
|---|---|---|---|---|---|---|
| 1a | 3.1 | 187 | 134 | 28.3 | 52 | 1265 |
| 1b | 2.7 | 153 | 67 | 56.2 | 35 | 430 |
| 1c | 2.9 | 170 | 73 | 57.1 | 24 | 27 |
| 2 | 3.0 | 167 | 112 | 32.9 | 17 | 50 |
| 3 | 3.0 | 168 | 118 | 29.8 | 12.5 | 18 |
| 4a | 3.2 | 175 | 146 | 16.6 | 22 | 157 |
| 4b | 2.9 | 174 | 141 | 19.0 | 9 | 18 |
| 5a | 3.2 | 175 | 162 | 7.4 | 18 | 116 |
| 5b | 2.8 | 174 | 157 | 9.8 | 2.7 | 12 |
| 6a | 3.2 | 175 | 158 | 9.7 | 22 | 113 |
| 6b | 2.9 | 175 | 126 | 28.0 | 25 | 47 |
| 7a | 3.2 | 175 | 149 | 14.9 | 30.5 | 246 |
| 7b | 2.7 | 175 | 112 | 36.0 | 25 | 27 |
| 8a | 3.2 | 175 | 173 | 1.1 | — | 80 |
| 8b | 2.6 | 174 | 150 | 13.8 | 10 | 70 |
| 9a | 3.1 | 175 | 148 | 15.4 | 14 | 427 |
| 9b | 3.2 | 205 | 167 | 18.5 | 8 | 15 |
| 10a | 3.1 | 175 | 148 | 15.4 | 22 | 235 |
| 10b | 2.8 | 174 | 123 | 29.3 | 19 | 22 |

EXAMPLE II

The procedure of Example I is repeated except that the rate of treatment agent introduction is 300 ml/hr. The following runs are made:

(1) An aqueous solution comprising 10% by weight of 4-methyl pyridine, 10% by weight of urea and 0.1% by weight of a commercially available surfactant and the introduction temperature is 1520° F.;

(2) an aqueous solution comprising 10% by weight of 3-aminopyridine, 10% by weight of urea and 0.1% by weight of a commercially available surfactant and the introduction temperature is 1510° F ;

(3) An aqueous solution comprising 10% by weight of pyrrolidine, 10% by weight of urea and 0.1% by weight of a commercially available surfactant and the introduction temperature is 1520° F.;

(4) An aqueous solution comprising 10% by weight of 2-oxazolidone, 10% by weight of urea and 0.1% by weight of a commercially available surfactant and the introduction temperature is 1540° F.;

(5) An aqueous solution comprising 10% by weight of pyrazole, 10% by weight of urea and 0.1% by weight of a commercially available surfactant and the introduction temperature is 1540° F.;

(6) An aqueous solution comprising 10% by weight of imidazole, 10% by weight of urea and 0.1% by weight of a commercially available surfactant and the introduction temperature is 1540° F.;

(7) An aqueous solution comprising 10% by weight of pyrazine, 10% by weight of urea and 0.1% by weight of a commercially available surfactant and the introduction temperature is 1535° F.;

(8) An aqueous solution comprising 10% by weight of pyrrole, 10% by weight of urea and 0.1% by weight of a commercially available surfactant and the introduction temperature is 1540° F.;

(9) An aqueous solution comprising 10% by weight of piperidine, 10% by weight of urea and 0.1% by weight of a commercially available surfactant and the introduction temperature is 1530° F.;

(10) An aqueous solution comprising 10% by weight of piperazine, 10% by weight of urea and 0.1% by weight of a commercially available surfactant and the introduction temperature is 1535° F.;

(11) An aqueous solution comprising 10% by weight of piperazine, 6% by weight of ammonia and 0.1% by weight of a commercially available surfactant and the introduction temperature is 1530° F.;

(12) An aqueous solution comprising 10% by weight of imidazole, 6% by weight of ammonia and 0.1% by weight of a commercially available surfactant and the introduction temperature is 1535° F.; and

(13) An aqueous solution comprising 10% by weight of methyl pyridine, 6% by weight of ammonia and 0.1% by weight of a commercially available surfactant and the introduction temperature is 1540° F.

The results are set out in Table 2:

TABLE 2

| Run | $O_2$ (%) | $NO_x$ (ppm) Baseline | Final | $NO_x$ red. (%) | $NH_3$ (ppm) | CO (ppm) |
|---|---|---|---|---|---|---|
| 1 | 3.0 | 186 | 37 | 80.1 | 70 | 53 |
| 2 | 3.2 | 165 | 108 | 34.5 | 97 | 46 |
| 3 | 2.9 | 169 | 80 | 52.7 | 92 | 157 |
| 4 | 2.7 | 174 | 101 | 42.0 | 97 | 185 |
| 5 | 2.6 | 174 | 61 | 64.9 | 53 | 140 |
| 6 | 2.7 | 174 | 138 | 20.7 | 86 | 180 |
| 7 | 2.6 | 174 | 88 | 49.4 | 97 | 140 |
| 8 | 2.5 | 174 | 63 | 63.8 | 87.5 | 256 |
| 9 | 2.8 | 205 | 88 | 57.1 | 47 | 85 |
| 10 | 2.6 | 174 | 75 | 56.9 | 89 | 130 |
| 11 | 2.7 | 205 | 87 | 57.6 | 25 | 101 |
| 12 | 2.8 | 205 | 132 | 35.6 | 8 | 113 |
| 13 | 2.6 | 205 | 70 | 65.9 | 26 | 27 |

As the data presented in Tables 1 and 2 clearly indicates, the use of a five or six-membered heterocyclic hydrocarbon having at least one cyclic nitrogen, especially in combination with urea or ammonia, achieves significant reductions in the concentration of nitrogen oxides in the effluent from the combustion of a carbonaceous fuel, and can do so without substantial production of other pollutants such as ammonia and carbon monoxide.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of the concentration of nitrogen oxides in the effluent from the combustion of a carbonaceous fuel, the process comprises introducing a heterocyclic hydrocarbon selected from the group consisting of piperazine, piperidine, pyrazine, pyrazole, imidazole, oxazolidone, pyrrole and pyrrolidine into the effluent having an effluent temperature of greater than about 1200° F. under conditions effective to reduce the concentration of nitrogen oxides in the effluent.

2. The process of claim 1 wherein said heterocyclic hydrocarbon comprises piperazine.

3. The process of claim 1 wherein said heterocyclic hydrocarbon comprises piperidine.

4. The process of claim 1 wherein said heterocyclic hydrocarbon comprises pyrrole.

5. The process of claim 1 wherein said heterocyclic hydrocarbon comprises pyrrolidine.

6. The process of claim 1 wherein said heterocyclic hydrocarbon comprises pyrazole.

7. The process of claim 1 wherein said heterocyclic hydrocarbon comprises imidazole.

8. The process of claim 1 wherein said heterocyclic hydrocarbon comprises 2-oxazolidone.

9. The process of claim 1 wherein said heterocyclic hydrocarbon comprises pyrazine.

10. The process of claim 1 wherein the temperature of the effluent is greater than about 1300° F.

11. The process of claim 10 wherein the temperature of the effluent is greater than about 1450° F.

12. The process of claim 1 wherein the temperature of the effluent is below about 2000° F.

13. The process of claim 1 wherein said treatment agent is introduced into the effluent at a molar ratio of the nitrogen contained in said treatment agent to the baseline nitrogen oxides level of 1:5 to about 10:1.

14. The process of claim 13 wherein the molar ratio of treatment agent nitrogen to the baseline nitrogen oxides level is about 1:3 to about 5:1.

15. The process of claim 1 wherein said treatment agent is in solution, in a mixture or in a dispersion.

16. The process of claim 15 wherein said solution, mixture or dispersion comprises water.

17. The process of claim 1 wherein said treatment agent further comprises urea or ammonia.

18. The process of claim 15 wherein urea or ammonia is present in said solution, mixture or dispersion in an amount of about 2% to about 60% by weight.

19. The process of claim 15 wherein said heterocyclic hydrocarbon is present in said solution, mixture or dispersion in an amount of about 0.5% to about 25% by weight.

20. The process of claim 1 wherein the effluent comprises an excess of oxygen.

21. The process of claim 20 wherein said effluent has an excess of oxygen of no greater than about 12% by volume.

22. The process of claim 21 wherein said excess of oxygen in the effluent is about 1% to about 6% by volume.

23. A process for the reduction of the concentration of nitrogen oxides in the oxygen-rich effluent from the combustion of a carbonaceous fuel, the process comprising introducing a treatment agent which comprises urea or ammonis and further comprises a heterocyclic hydrocarbon selected from the group consisting of piperazine, piperidine, pyrazine, pyrazole, imidazole, oxazolidone, pyrrole and pyrrolidine into an effluent having a temperature greater than about 1200° F. under conditions effective to reduce the concentration of nitrogen oxides in the effluent.

24. The process of claim 23 wherein said heterocyclic hydrocarbon comprises piperazine.

25. The process of claim 23 wherein said heterocyclic hydrocarbon comprises piperidine.

26. The process of claim 23 wherein said heterocyclic hydrocarbon comprises pyrrole.

27. The process of claim 23 wherein said heterocyclic hydrocarbon comprises pyrrolidine.

28. The process of claim 23 wherein said heterocyclic hydrocarbon comprises pyrazole.

29. The process of claim 23 wherein said heterocyclic hydrocarbon comprises imidazole.

30. The process of claim 23 wherein said heterocyclic hydrocarbon comprises pyrazine.

31. The process of claim 23 wherein said heterocyclic hydrocarbon comprises 2-oxazolidone.

32. The process of claim 23 wherein the effluent is at a temperature of greater than about 1300° F.

33. The process of claim 32 wherein the effluent is at a temperature of greater than about 1450° F.

34. The process of claim 23 wherein said treatment agent is in solution, in a mixture or in a dispersion.

35. The process of claim 34 wherein said solution, mixture or dispersion comprises water.

36. The process of claim 35 wherein urea or ammonia is present in said solution, mixture or dispersion in an amount of about 2% to about 60% by weight.

37. The process of claim 36 wherein said heterocyclic hydrocarbon is present in said solution, mixture or dispersion in an amount of about 0.5% to about 25% by weight.

38. The process of claim 23 wherein said treatment agent is introduced into the effluent at a molar ratio of the nitrogen contained in said treatment agent to the baseline nitrogen oxides level of about 1:5 to about 10:1.

39. The process of claim 38 wherein the molar ratio of treatment agent nitrogen to baseline nitrogen oxides level is about 1:3 to about 5:1.

40. The process of claim 23 wherein said effluent has an excess of oxygen of no greater than about 12% by volume.

41. A process for the reduction of the concentration of nitrogen oxides in the oxygen-rich effluent from the combustion of a carbonaceous fuel, the process comprising introducing a treatment agent which comprises an aqueous solution, mixture or dispersion of about 2% to about 60% urea or ammonia by weight and about 0.5% to about 25% of a compound selected from the group consisting of piperazine, piperidine, pyridine, oxazolidone, pyrazole, imidazole, pyrazine, pyrrole and pyrrolidine by weight into an effluent having an excess of oxygen of about 1% to about 12% by volume and a temperature of about 1300° F. to about 2000° F. in an amount sufficient to provide a molar ratio of the nitrogen contained in said treatment agent to the baseline nitrogen oxides level of about 1:3 to about 5:1, under conditions effective to reduce the nitrogen oxides level in the effluent.

42. The process of claim 23 wherein the effluent is at a temperature below about 2000° F.

* * * * *